United States Patent
Allert

(10) Patent No.: US 11,043,813 B2
(45) Date of Patent: Jun. 22, 2021

(54) METHOD FOR BLACK STARTING A POWER SUPPLY INSTALLATION, BIDIRECTIONAL INVERTER, AND POWER SUPPLY INSTALLATION WITH A BIDIRECTIONAL INVERTER

(71) Applicant: SMA Solar Technology AG, Niestetal (DE)

(72) Inventor: Claus Allert, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/931,936

(22) Filed: May 14, 2020

(65) Prior Publication Data
US 2020/0274362 A1 Aug. 27, 2020

Related U.S. Application Data

(63) Continuation of application No. PCT/EP2018/081465, filed on Nov. 15, 2018.

(30) Foreign Application Priority Data

Nov. 17, 2017 (DE) ...................... 10 2017 127 081.7

(51) Int. Cl.
*H02J 3/32* (2006.01)
*H02J 3/38* (2006.01)
*H02J 9/06* (2006.01)

(52) U.S. Cl.
CPC ................ *H02J 3/32* (2013.01); *H02J 3/381* (2013.01); *H02J 3/388* (2020.01); *H02J 9/06* (2013.01); *H02J 2300/24* (2020.01)

(58) Field of Classification Search
CPC .... H02J 3/32; H02J 3/388; H02J 3/381; H02J 9/06; H02J 300/24; H02J 3/38
See application file for complete search history.

(56) References Cited

U.S. PATENT DOCUMENTS

| | | |
|---|---|---|
| 2004/0135609 A1 | 7/2004 | Horbelt |
| 2012/0126623 A1 | 5/2012 | Koehl |
| 2012/0139245 A1 | 6/2012 | Wobben |
| 2013/0320842 A1 | 12/2013 | Beck |
| 2016/0241032 A1 | 8/2016 | Zimmanck |
| 2017/0005564 A1 | 1/2017 | Somani |

FOREIGN PATENT DOCUMENTS

| | | |
|---|---|---|
| DE | 102014009931 A1 | 7/2014 |
| EP | 2465522 A1 | 10/2013 |

OTHER PUBLICATIONS

International Search Report and Written Opinion dated Feb. 12, 2019 in connection with PCT/EP2018/081465.

*Primary Examiner* — Robert L Deberadinis
(74) *Attorney, Agent, or Firm* — Eschweiler & Potashnik, LLC

(57) ABSTRACT

A method for black starting a power supply device is disclosed, wherein the power supply device includes at least one bidirectional inverter having an AC-side connection for a grid and a battery connected to the DC side of the bidirectional inverter. The method includes operating an activation device of the power supply device so that the activation device applies a voltage to a control line of the battery to place the battery into an operating state, wherein the voltage provided by the activation device is provided by an auxiliary battery. The method also includes putting the bidirectional inverter into an operating state after the voltage provided by the auxiliary battery is applied to the control line.

21 Claims, 5 Drawing Sheets

METHOD FOR BLACK STARTING A POWER SUPPLY INSTALLATION, BIDIRECTIONAL INVERTER, AND POWER SUPPLY INSTALLATION WITH A BIDIRECTIONAL INVERTER

CROSS REFERENCE TO RELATED APPLICATIONS

This application is a continuation of International Patent Application number PCT/EP2018/081465, filed on Nov. 15, 2018, which claims priority to German Patent Application number 102017127081.7, filed on Nov. 17, 2017, and is hereby incorporated by reference in its entirety.

FIELD

The disclosure relates to a method for black starting a power supply device comprising a bidirectional inverter and a battery connected to the DC side of the inverter.

The disclosure also relates to a bidirectional inverter suitable for use with the method. The bidirectional inverter comprises a control device and interfaces for connecting a battery on the DC side and for connecting of a grid on the AC side. The interfaces for connecting the battery on the DC side comprise at least one supply interface for connecting two battery poles to the inverter.

BACKGROUND

Power supply devices of this kind can for example buffer-store electrical energy of a public grid and/or from solar modules and/or from wind turbines in the battery. The inverter converts DC voltage into AC voltage, and vice versa. To charge and discharge the battery, said inverter transports electrical energy in both directions, that is to say for example from the AC-side connection to the battery and vice versa.

A black start for a power supply device or a power station refers to when the power supply device is started without an external supply of energy.

Such a situation can arise for example in the case of a power supply device of a domestic installation that comprises a solar installation and is additionally designed for emergency operation. The power supply device shuts down, for example, or puts itself into an idle mode (standby mode) when the battery has reached a lower charging limit and at the same time the battery is not expected to be charged by the solar installation, e.g. at night.

DE 103 20 087 A1 discloses a method for operating a wind farm and a wind farm having a central apparatus for controlling the wind farm. In order to render the wind farm capable of black starting, said wind farm comprises a permanently excited wind turbine with motorless wind direction tracking. This permanently excited wind turbine can be started up even if no energy can be obtained externally.

SUMMARY

The disclosure is directed to a method of the type cited at the outset and a power supply device of the type cited at the outset that allow the power supply device to be black started. The disclosure is also directed to a bidirectional inverter and a separate backup device of the type cited at the outset that are usable as parts of the power supply device.

The disclosure comprises a first method act that involves an activation device of the power supply device being operated, so that the activation device applies a voltage to a control line of the battery such that the battery is put into an operating state. The voltage provided by the activation device is provided by an auxiliary battery. A further method act comprises the bidirectional inverter being put into an operating state after the voltage provided by the auxiliary battery is applied to the control line.

In one embodiment the method allows a power supply device of the type cited at the outset to be black started from a state in which the inverter and the battery are in a shut-down state or in a standby mode.

The black starting method according to the disclosure involves the energy from an auxiliary battery of the power supply device being used to put the battery into an operating state. This is done by providing a voltage on a control line of the battery. The control line can also be referred to as an Enable line. The voltage in this case is chosen such that it corresponds to an enabling signal of the battery. The enabling signal can also be referred to as Enable signal or Active signal and can correspond to a constant voltage value that is dependent on the design of the battery. In other words, the battery changes from the shut-down state or standby mode to an operating state when the enabling signal is applied to the control line. For safety reasons, the battery can be shut down again after an activation if a communication connection to the inverter cannot be set up within a defined period. This prevents the battery from simply being discharged when the communication cable is disconnected. If the enabling signal is removed, this can lead to the battery shutting down, in particular if an enabling signal is not applied to another control line of the battery. According to the disclosure, it is therefore proposed that the battery be started up with a voltage on an Enable line of the battery. This has the advantage that starting up the battery by means of the provision of the voltage uses up little energy and the auxiliary battery is not exposed to high loads. Subsequently, the disclosure involves the inverter being put into an operating state after the voltage provided by the auxiliary battery is applied to the control line.

The activation apparatus for providing the enabling signal can be operable automatically and/or by remote control and/or manually. The activation apparatus can have one or more switching positions for manual operation, at least one switching position being designed for black starting. The auxiliary battery can be a rechargeable battery. The activation apparatus can have more than one auxiliary battery. The power supply device can also comprise multiple such activation apparatuses.

Advantageous embodiments of the disclosure are specified in the description below, the features of which can be used individually and in any combination with one another.

A further advantageous embodiment of the disclosure can provide for a further method act to involve the battery that has been put into an operating state by the activation device making a DC supply voltage available to the bidirectional inverter, which DC supply voltage puts the bidirectional inverter into an operating state.

This advantageous embodiment of the disclosure allows particularly reliable system management for the power supply device when black starting, since the bidirectional inverter is started up after the battery starts up.

Within the context of this disclosure, an alternating voltage is abbreviated to AC and a direct voltage is abbreviated to DC. Also, operating state of the bidirectional inverter or of the battery denotes one operating state, the bidirectional inverter and the battery being able to have multiple operating states. The bidirectional inverter can also be referred to just as inverter below.

According to this embodiment of the disclosure, it is proposed that the bidirectional inverter be put into an operating state by means of the battery, which is already in an operating state. The battery is connected to the DC side of the bidirectional inverter. By way of example, supply lines are used that connect the two poles of the battery to a DC supply interface of the inverter and for example are integrated in a common cable. In the state of shutdown or of the standby mode of the inverter and the battery, the supply lines can be broken or disconnected by means of appropriate switches. These supply lines can be used by the battery in the operating state to make a DC supply voltage available to the inverter. The battery can comprise a battery management system and a protection circuit, actuatable by the battery management system, having the respective switches. In the operating state that the battery is in after the control line has the enabling signal applied to it, said battery can use the battery management system to actuate the protection circuit such that it closes the respective switches in the supply lines in order to make a conductive connection to the inverter, and make a DC supply voltage available to the inverter via the supply lines. The voltage value of the DC supply voltage is chosen such that the inverter is put into an operating state. The operating state can comprise the operation of at least one control assembly of the inverter, for example, wherein the at least one control assembly can comprise a microcontroller in each case. The control assembly can also be referred to as control device or control/controlling device within the context of this disclosure. A clocking of the power semiconductor switches of the inverter bridge of the inverter can take place at a later time in the startup process.

It can also be regarded as advantageous that the power supply device has a separate backup device or a backup device that the bidirectional inverter comprises, and in the first case the separate backup device is additionally supplied with the supply voltage and put into an operating state, in particular by the bidirectional inverter.

According to this embodiment of the disclosure, the power supply device can comprise an inverter-internal or separate backup device, wherein, in the latter case, the bidirectional inverter, in the operating state, can put the separate backup unit into an operating state. To this end, the bidirectional inverter can apply an enabling signal to a control line routed from the inverter to the backup device and can apply a DC supply voltage to supply lines of the backup device. The order of provision of the enabling signal and DC supply voltage can be irrelevant in this case. The backup device could also be designed such that it is put into an operating state by the mere provision of the DC supply voltage, and a separate Enable line is not present.

Alternatively, the separate backup device could also be put into an operating state directly by the battery in an analogous manner.

The backup device can comprise or actuate sensors and/or contactors, for example. The backup device can have a control module, wherein the control module can comprise a microcontroller. The control module can also be referred to as a control device. The backup device can be designed so as, in interaction with the bidirectional inverter, to allow emergency operation in a local grid in the event of failure of a public grid. To this end, the backup device can be designed inter alia to detect a failure of the public grid and to disconnect the local grid connected to the AC side of the inverter from the public grid.

A further advantageous embodiment of the disclosure can provide for the bidirectional inverter, in the operating state, to take over the provision of the voltage, initially provided by the activation device, on a control line of the battery, and for the activation device to be put into an initial state for the battery This embodiment of the disclosure prevents a complete discharge of the auxiliary battery and hence unwanted removal of the enabling signal on the control line of the battery.

The resetting of the activation apparatus to an initial state for the battery relates to the option of operating the activation apparatus in order to start a fresh black start for the power supply device. The resetting can comprise recharging the auxiliary battery.

The activation apparatus can be comprised by the bidirectional inverter. By way of example, an operating means of the activation apparatus can be arranged on the outside of a housing of the inverter. The auxiliary battery can be integrated in a control assembly of the inverter, for example. Operating the activation apparatus for a black start allows a first switch of the control assembly to be closed, so that a voltage provided by the auxiliary battery is connected to an interface for the control line of the battery. When provision of the voltage is taken over by the inverter, a further switch on a further conductor track of the control assembly can be closed, so that an enabling signal from an internal voltage source of the control assembly is connected to an interface for a control line of the battery, and the first switch is opened again by the control assembly in order to reset the activation apparatus. The internal voltage source of the control assembly is powered by the DC supply voltage provided by the battery that has already started up. The control assembly can also be referred to as a control device or a control/controlling device within the context of this disclosure.

A further advantageous embodiment of the disclosure can provide for a handshake protocol to be started between the battery and the bidirectional inverter for the purpose of setting up a communication between the two.

A handshake protocol should be understood to mean an interchange of data by means of which the devices interchange data relating to the connection and/or the devices for the purpose of setting up a communication. The data interchange can be effected by cable or wirelessly. By way of example, it can be effected using a field bus connection between the bidirectional inverter and the battery. Following successful completion of the handshake protocol, a communication between the bidirectional inverter and the battery can be started.

It can also be regarded as advantageous that the absence of successful communication setup between the bidirectional inverter and the battery results in the provision of a DC supply voltage for the bidirectional inverter by the battery being stopped.

This ensures reliable system management when the power supply device is black started. Provided that the bidirectional inverter is not supplied with a DC supply voltage by other batteries at this time, the inverter can be configured such that it changes to a shut-down state or to a standby mode. Additionally, the battery can also change to a shut-down state or to a standby mode in this case.

According to a further advantageous embodiment of the disclosure, the method can be performed using a power supply device that comprises further batteries connected to the bidirectional inverter. According to the advantageous embodiment of the disclosure, black starting the power supply device involves the further batteries each being provided with a voltage on a control line, which voltages put the further batteries into an operating state. The voltage is provided by the activation apparatus and/or the bidirectional inverter, wherein the further batteries in the operating state, each make a DC supply voltage available to the bidirectional inverter. A handshake protocol is started between the further battery and the bidirectional inverter in each case for the purpose of setting up a communication between the two.

The advantageous embodiment of the disclosure allows black starting of a power supply device that permits the buffer-storage of larger amounts of energy as a result of a higher number of connected batteries on the inverter. The redundant embodiment of the batteries moreover increases the fail safety of the power supply device. Providing that the enabling signals are provided by the activation apparatus, the batteries can be put into an operating state in parallel, which speeds up black starting of the power supply device. Alternatively and in order to preserve the at least one auxiliary battery, it is alternatively possible for the inverter to provide an enabling signal to the further batteries on their control lines after it has been put into operating state by the battery activated directly by the activation apparatus.

According to a further advantageous embodiment of the disclosure, the method can involve the use of a power supply device that comprises further bidirectional inverters, each having at least one battery connected to the further bidirectional inverter. In each case at least one connected battery of the further bidirectional inverters is provided with a voltage on a control line that puts the connected battery into an operating state. The voltage is provided by the activation device or the bidirectional inverter or a separate backup device put into an operating state by the bidirectional inverter.

The advantageous embodiment of the disclosure allows black starting of a power supply device that can be designed for emergency supply of a polyphase local grid.

The batteries of the further bidirectional inverters that have been put into an operating state make a DC supply voltage available to the respective further inverter analogously to the explanations above, as a result of which the further bidirectional inverters are put into an operating state in an analogous manner. A handshake protocol is started between the respective battery and the further inverter in each case for the purpose of setting up a communication between the two. The inverters and batteries of the power supply device can be embodied using the same design. If the power supply device comprises a separate backup device according to the explanations above, the latter is likewise able, following startup, to take over the provision of an enabling signal for at least one battery connected to the further bidirectional inverters. In this case, it is advantageous if the backup device is likewise supplied with a supply voltage by the further inverters if the first inverter, which has put the backup device into operation, shuts down again owing to failed communication setup with the battery that supplies power to it.

If setup of a communication between at least the bidirectional inverter and the battery or a further battery connected to the bidirectional inverter or between a further bidirectional inverter of the power supply device and a battery connected to the further inverter is successful, the power supply device is able, depending on its embodiment and the external conditions present, to react as per normal operation.

By way of example, the power supply device can be designed to provide an emergency supply. If the power supply device detects failure of a public grid by means of the backup device after black starting, the backup device can disconnect the public grid from a local grid, and the at least one bidirectional inverter can begin the clocking of the inverter bridge in order to set up an electrical island grid in the local grid.

Within the context of this disclosure, the term grid is supposed to refer primarily to the physical form of the grid with the lines. The term electrical grid is supposed to refer primarily to the AC voltage provided in a grid.

It is a further object of the disclosure to specify a bidirectional inverter and a backup device of the type cited at the outset that are alternatively suitable as parts of the power supply device, so that black starting of the power supply device is possible.

The disclosure is directed to a bidirectional inverter of the type cited at the outset, wherein the bidirectional inverter comprises a control device and interfaces for connecting a battery on the DC side and for connecting a grid on the AC side, wherein at least one supply interface is arranged for connecting two battery poles of the battery to the inverter. Additionally, the bidirectional inverter comprises an interface for a control line of the battery and an activation apparatus having an auxiliary battery. The activation device is configured so as, when the activation apparatus is operated in the event of a black start, to provide on the interface with the control line a voltage, provided by the auxiliary battery, that is suitable for starting up the battery.

According to this embodiment of the disclosure, it is therefore proposed that the activation apparatus be integrated into the inverter. This allows the activation apparatus to be easily locatable and reduces production costs for the power supply device.

By way of example, an operating means of the activation apparatus can be arranged on the outside of the housing of the inverter.

According to an advantageous embodiment of the bidirectional inverter, the bidirectional inverter can be designed and configured such that it is able to be put into an operating state by the battery in the event of a black start, in particular by applying to the supply interface a DC supply voltage, provided by the battery, that is suitable for putting the bidirectional inverter into an operating state.

Even if the activation apparatus is comprised by the inverter, the inverter is not yet in an operating state when the activation apparatus is operated. At this instant, the auxiliary battery merely makes an enabling signal available on the respective interface/s. The bidirectional inverter is started up only as a result of appropriate provision of a DC supply voltage by the battery.

It can also be regarded as advantageous that the control device is configured so as, in the event of a black start, to take over the provision of a voltage to maintain the operating state of the battery after the bidirectional inverter is started up.

The control device can for example take over the provision of the voltage after successful setup of a communication with the battery or before or while a handshake protocol is started with the battery or directly after the inverter is started up. A further advantageous embodiment of the bidirectional inverter can provide for the control device to be configured to put the activation device into an initial state for the battery after said provision is taken over.

It can also be regarded as advantageous that the bidirectional inverter comprises interfaces for connecting multiple batteries. The activation apparatus is designed and operable such that the activation device, in the event of a black start, provides on the interfaces for the control lines voltages, provided by the auxiliary battery, that are suitable for starting up the batteries. The control device is designed so as, in the event of a black start, to take over the provision of the voltages to maintain the operating state of the batteries after the bidirectional inverter is started up and to put the activation device into an initial state for the batteries Alternatively, the activation apparatus could also put just one of the batteries into an operating state, and the bidirectional inverter, after it is started up, could provide the enabling signals on the respective control lines of the remainder of the batteries connected to the inverter and take over the provision of the enabling signal on the first control line and put the activation apparatus into an initial state for the battery.

Further, there can advantageously be provision for the DC side of the bidirectional inverter to additionally have an input for connecting a solar installation.

To this end, the bidirectional inverter can comprise a DC link circuit, wherein the supply interfaces for the battery and the solar installation make a connection to the DC link circuit. The inverter can comprise an internal DC input chopper between the supply interface and the DC link circuit in each case.

According to a further advantageous embodiment of the disclosure, the bidirectional inverter can comprise an internal backup device or a connection for a separate backup device, wherein the connection comprises at least one supply interface, wherein, in the second case, the control device is configured so as, in the event of a black start, to provide a supply voltage on the supply interface after the bidirectional inverter is started up and to put the separate backup device into an operating state.

If the separate backup device additionally needs an enabling signal at a control link input in order to start it up, the bidirectional inverter can comprise an additional interface for a control line of the separate backup device, and the control device can be configured to additionally provide an enabling signal on the additional interface after the inverter is started up.

Further, there can advantageously be provision for the bidirectional inverter to comprise at least one field bus interface for communication with the battery.

The disclosure is directed to a backup device comprising a control device and an activation apparatus having an auxiliary battery, and at least one interface for a supply voltage of the backup device and at least one interface for the control line of a battery, wherein the activation device is configured so as, when the activation device is operated in the event of a black start, to provide on the at least one interface for the control line of the battery a voltage, provided by the auxiliary battery, that is suitable for starting up the battery According to this embodiment of the disclosure, it is therefore alternatively proposed that the activation apparatus be integrated into the backup device. This is particularly advantageous in the case of a power supply device for an emergency supply with multiple inverters, since the black starting process can be speeded up, as all connected inverter systems can be activated at the same time, instead of in succession.

By way of example, an operating means of the activation apparatus can be arranged on the outside of the housing of the backup device.

According to an advantageous embodiment of the backup device, the backup device can be configured such that from a shut-down state or standby mode, when the interface for the supply voltage has a supply voltage applied to it or the interface for the supply voltage has a supply voltage applied to it and additionally an interface for a control line of the backup device has an enabling signal applied to it, the backup device changes to an operating state.

Even if the activation apparatus is comprised by the backup device, the backup device is not yet in an operating state when the activation apparatus is operated to black start the power supply device. At this instant, the auxiliary battery merely makes an enabling signal available on the at least one respective interface. The backup device is started up only as a result of the provision of a supply voltage or the provision of a supply voltage and an enabling signal. This is dependent on the design of the backup device. The supply voltage can be provided by an inverter or by a battery of the power supply device, for example.

It can also be regarded as advantageous that at least one further interface for a supply voltage of the backup device or at least one further interface for a supply voltage of the backup device and at least one further interface for a control line of the backup device is comprised.

This has the advantage that the power supply device can provide an emergency supply even if a first bidirectional inverter that has put the backup device into an operating state shuts down again or changes to a standby mode owing to failed communication setup with the at least one connected battery. In this case, it is sufficient for at least one of the other bidirectional inverters to remain in an operating state and to supply the backup device with a supply voltage and if necessary additionally with an enabling signal.

The disclosure is directed to a power supply device of the type cited at the outset, wherein at least one activation apparatus having an auxiliary battery is comprised, and the bidirectional inverter comprises interfaces for connecting the battery on the DC side, wherein at least one supply interface is arranged for connecting two battery poles to the bidirectional inverter. The activation device is configured so as, when the activation device is operated in the event of a black start, to provide on an interface for a control line of at least one battery a voltage, provided by the auxiliary battery, that is suitable for setting up the battery.

According to an advantageous embodiment of the power supply device, there can be provision for a separate backup device to be comprised.

Further expedient embodiments and advantages of the disclosure are the subject of the description of exemplary embodiments of the disclosure with reference to the figure of the drawing, wherein identical reference numerals refer to components having identical action.

DETAILED DESCRIPTION

The disclosure relates to a method for black starting a power supply device comprising a bidirectional inverter and a battery connected to the DC side of the inverter.

The disclosure also relates to a bidirectional inverter suitable for use with the method. The bidirectional inverter comprises a control device and interfaces for connecting a battery on the DC side and for connecting of a grid on the AC side. The interfaces for connecting the battery on the DC side comprise at least one supply interface for connecting two battery poles to the inverter.

The disclosure also relates to a backup device for a power supply device that is suitable for use with the method.

The disclosure also relates to a power supply device suitable for use with the method. The power supply device comprises at least one bidirectional inverter having an AC-side interface for connection of a grid, and at least one battery connected to the DC side of the inverter.

Figure 1:
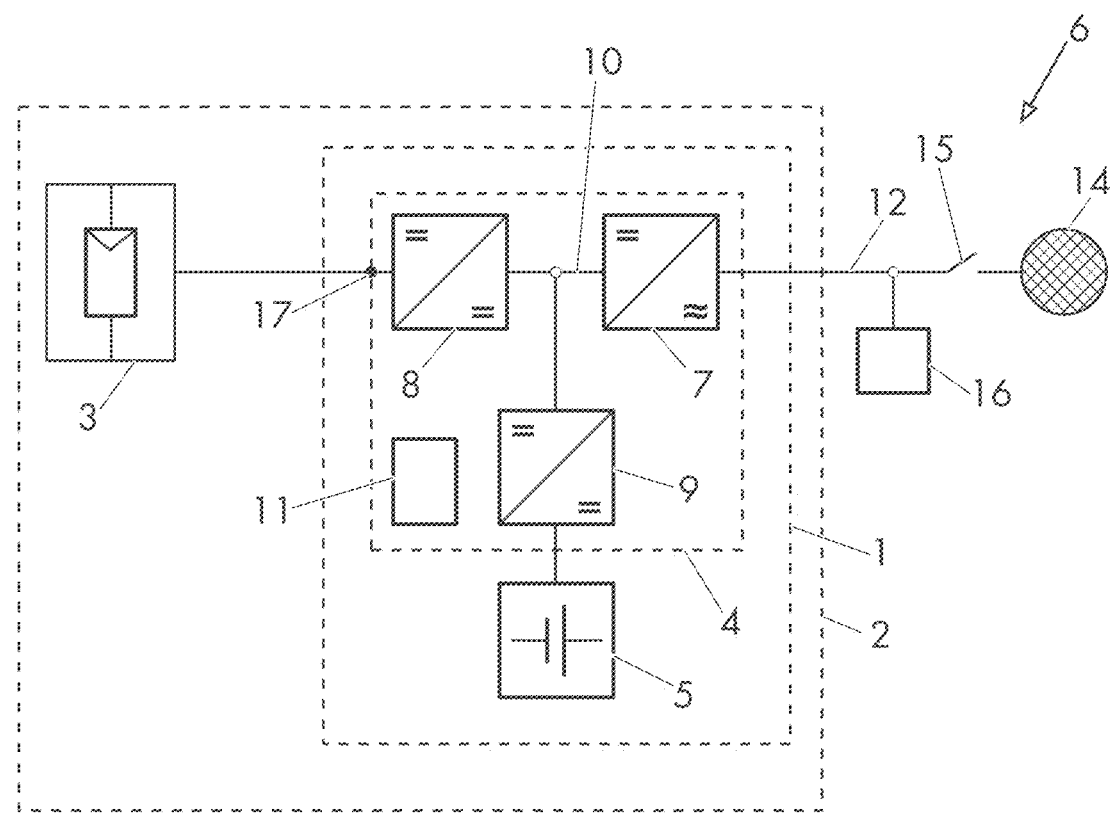
FIG. 1 schematically shows a power supply device.

FIG. 1 schematically shows a conventional power supply device 1. The power supply device 1 is part of a power station 2 having a solar installation 3. The power supply device 1 comprises a bidirectional inverter 4 and a battery 5, wherein the AC side of the bidirectional inverter 4 has a grid 6 connected to it and the DC side of the bidirectional inverter has the battery 5 and the solar installation 3 connected to it. The parts of the bidirectional inverter that are depicted in the figure are an inverter bridge 7, two input DC choppers 8 and 9 and also a DC link circuit 10 and a control device 11. The DC link circuit 10 comprises a DC link capacitor (not depicted). The grid 6 connected to the AC side of the bidirectional inverter 4 comprises a local grid 12 and a public grid 14. The local grid 12 can be reversibly disconnected from the public grid 14 by means of an isolating switch 15. The local grid 12 has a load 16 connected to it. The solar installation 3 is connected to an input 17 of the bidirectional inverter 4 on the DC side.

The bidirectional inverter 4 can transport electrical energy in both directions. The battery 5 can therefore be charged with electrical energy from the grid 6 or by the solar installation 3 via the bidirectional inverter 4. Electrical energy can be supplied to the grid 6 by the solar installation 3 and the battery 5 via the bidirectional inverter 4. The bidirectional inverter 4 can comprise further supplementary functions, such as for example the provision of power to support the public grid 14 or optimization of an operating point of the solar installation 3 (MPP tracking).

Figure 2:
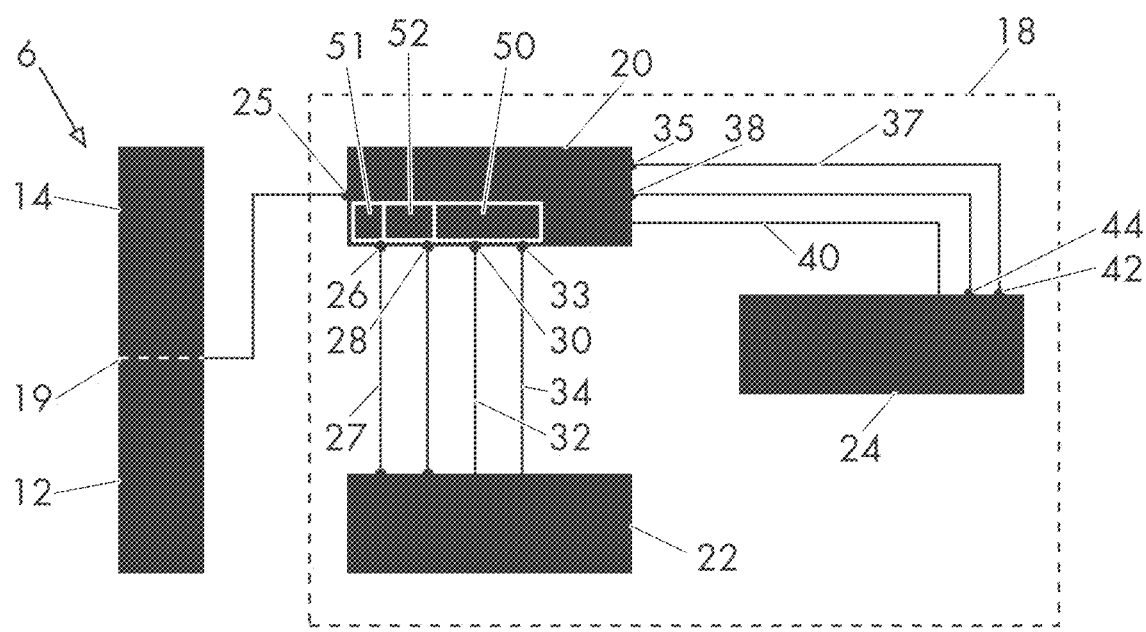
FIG. 2 schematically shows a power supply device according to an exemplary embodiment of the disclosure in a shut-down state, FIG. 3 schematically shows the power supply device of FIG. 2 at a first point in time during black starting according to an exemplary embodiment of the method according to the disclosure, FIG. 4 schematically shows the power supply device of FIG. 2 at a second point in time during black starting, FIG. 5 schematically shows the power supply device of FIG. 2 at a third point in time during black starting, FIG. 6 schematically shows the power supply device of FIG. 2 at a fourth point in time during black starting, FIG. 7 schematically shows the power supply device of FIG. 2 at a fifth point in time during black starting, FIG. 8 schematically shows the power supply device of FIG. 2 at a sixth point in time after completion of black starting according to the exemplary embodiment of the method according to the disclosure, and FIG. 9 schematically shows the power supply device of FIG. 2 at a seventh point in time during subsequent normal operation according to an exemplary embodiment.

FIG. 2 schematically shows a power supply device 18 according to a first exemplary embodiment of the disclosure in a shut-down state.

The power supply device 18 comprises a bidirectional inverter 20, a battery 22 connected to the DC side of the inverter and a separate backup device 24. For the purpose of connecting the battery 22, the bidirectional inverter 20 comprises interfaces with an interface 26 for a control line 27 of the battery and a supply interface 28 for connecting the two battery poles of the battery. Additionally, the bidirectional inverter 20 comprises a field bus interface 30 for a field bus connection 32 for communication with the battery. A further interface 33 is used to provide a supply of voltage for a battery management system of the battery 22 via the connection 34. In the direction of the separate backup device 24, the bidirectional inverter 20 comprises interfaces with an interface 35 for a control line 37, which actuates an interface 42, and a supply interface 38 for a supply voltage that is made available to the backup device on the interface 44. Additionally, another field bus connection 40 is depicted between the bidirectional inverter 20 and the separate backup device 24, for communication between the two devices.

An AC-side interface 25 of the bidirectional inverter 20 is connected to a grid 6. The grid 6 comprises a public grid 14 and a local grid 12, the two being able to be reversibly disconnected from one another by means of an isolating device 19.

The bidirectional inverter 20 comprises a control device 50 and an activation device 51. The activation device 51 has an auxiliary battery 52 and is partially integrated in the control device 50.

A method for black starting the power supply device 18 according to an exemplary embodiment of the disclosure will be depicted and explained in more detail below with reference to FIGS. 3 to 8, an explanation of the function of the power supply device 18 depicted here also being provided in association therewith.

Figure 3:
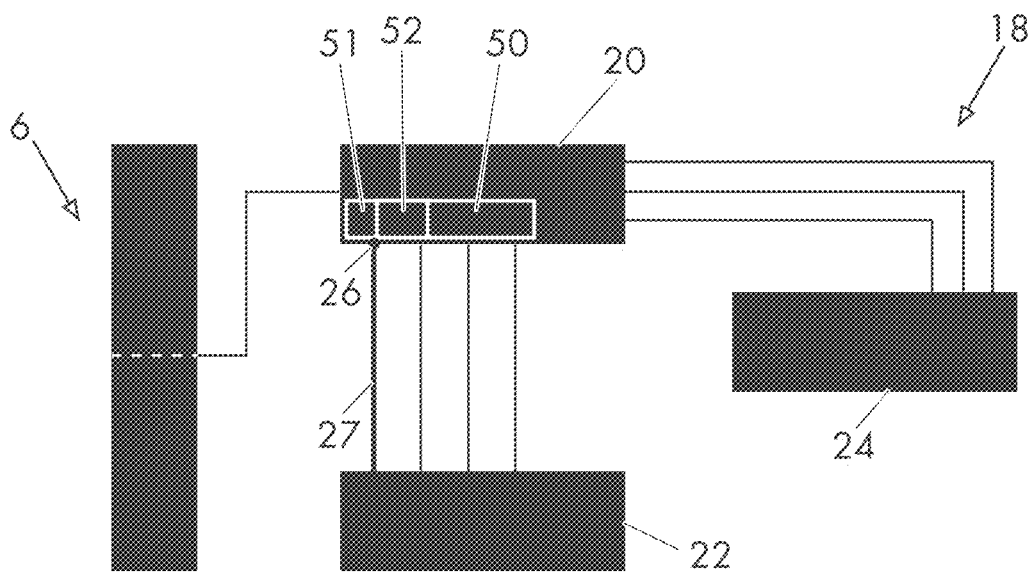

FIG. 3 schematically shows the power supply device 18 of FIG. 2 at a first point in time during black starting according to an exemplary embodiment of the method according to the disclosure. Only the reference numerals according to FIG. 2 that are relevant to the description of FIG. 3 are depicted.

At the first point in time, the activation device 51 has been operated and provides an enabling signal in the form of a voltage on the interface 26. The voltage is provided by the auxiliary battery 52 and applies an enabling signal to the control line 27. The application of the enabling signal to the control line 27 is identified in the figure by an emboldened line fashioning for the control line 27. At this point in time, the bidirectional inverter 20 is not in operating state as is intended to be understood within the context of this disclosure.

Figure 4:
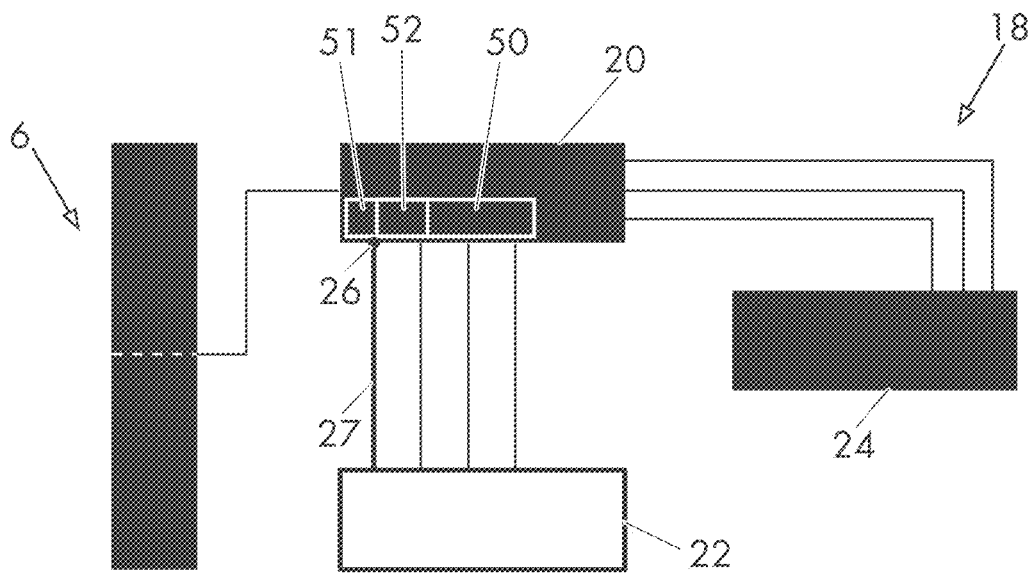

FIG. 4 schematically shows the power supply device 18 of FIG. 2 at a second point in time during black starting according to the exemplary embodiment of the method according to the disclosure. Similarly, only the reference numerals according to FIG. 2 that are relevant to the description of FIG. 4 are depicted.

As compared with FIG. 3, the battery 22 is now in an operating state at the second point in time, said operating state being identified in FIG. 4 by the lighter fashioning of the device. The battery 22 has been put into an operating state on account of the voltage applied to the control line 27. The control line 27 can also be referred to as Enable line. The voltage provided by the activation device 51 corresponds to a voltage value that is interpreted by the battery 22 as an enabling signal and puts said battery into an operating state. At the second point in time, the activation device 51 continues to make the enabling signal available.

Figure 5:
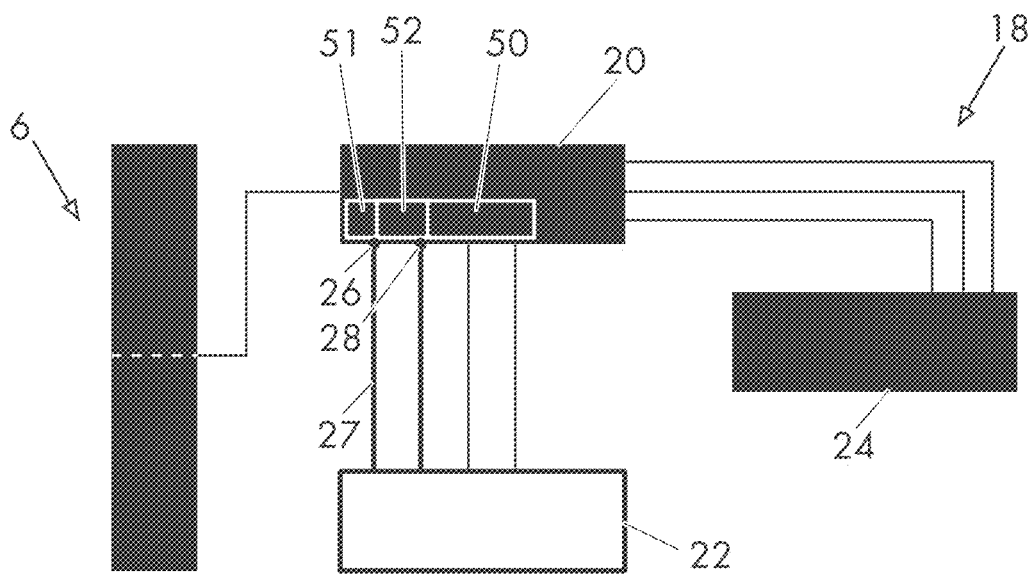

FIG. 5 schematically shows the power supply device of FIG. 2 at a third point in time during black starting according to the exemplary embodiment of the method according to the disclosure.

The battery 22, which is in an operating state, makes a DC supply voltage available to the bidirectional inverter 20 on the supply interface 28 at a third point in time, said DC supply voltage being suitable for putting the bidirectional inverter 20 into an operating state. The activation device 51 still applies the enabling signal to the control line 27 at this point in time.

Figure 6:
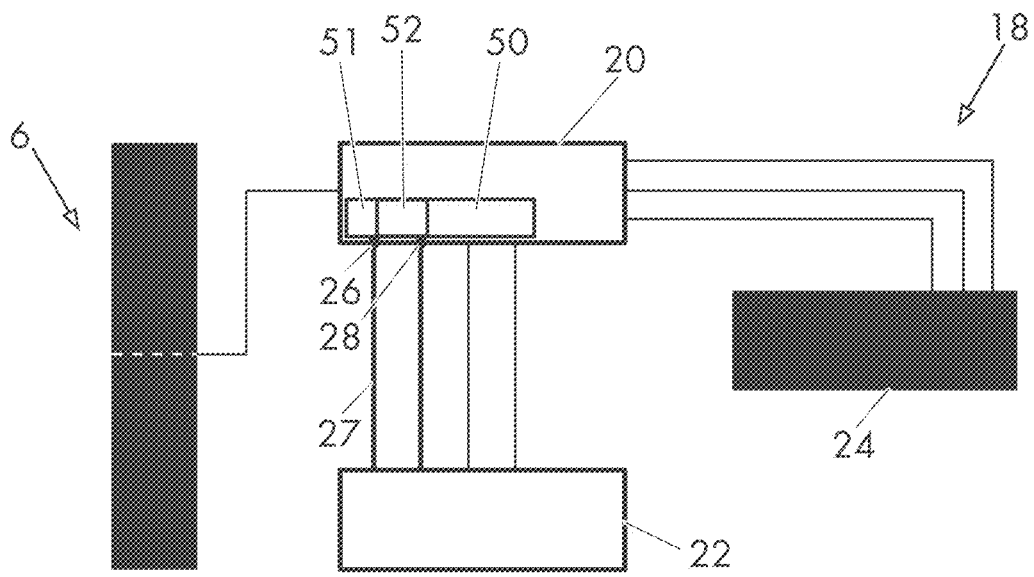

FIG. 6 schematically shows the power supply device 18 at a fourth point in time during black starting according to the exemplary embodiment of the method according to the disclosure.

The bidirectional inverter 20 has been put into an operating state by the DC supply voltage on the supply interface 28 and continues to be supplied with a DC supply voltage by the battery 22. The activation device 51 continues to use the auxiliary battery 52 to make the enabling signal available for the battery on the control line 27.

Figure 7:
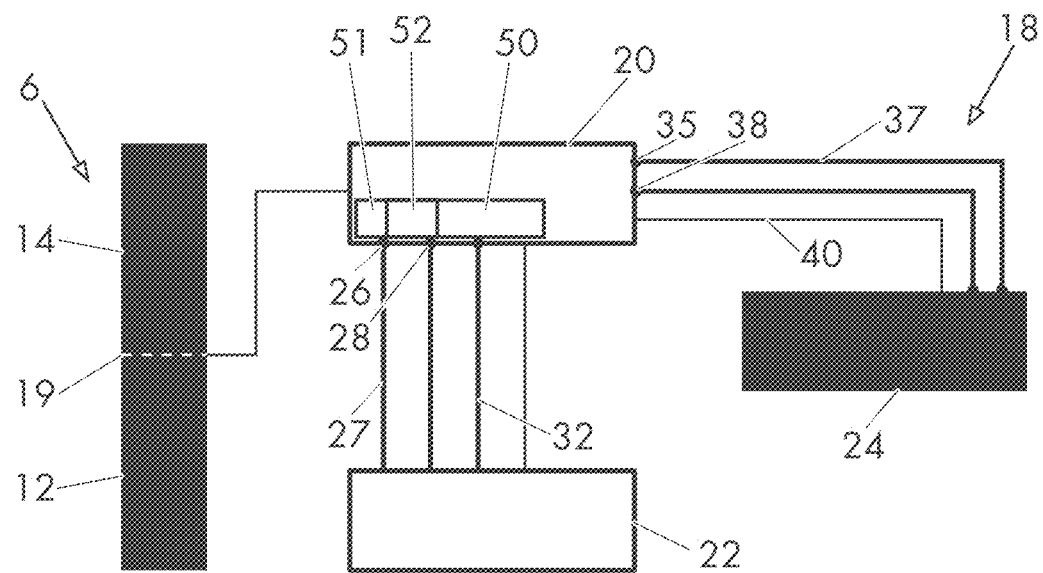

FIG. 7 schematically shows the power supply device 18 at a fifth point in time during black starting according to the exemplary embodiment of the method according to the disclosure.

The control device 50 of the bidirectional inverter 20 has taken over the provision of the voltage, initially provided by the auxiliary battery 52, on the interface 26 to maintain the operating state of the battery 22 and has put the activation device 51 into an initial state. The energy for this is obtained by the control device 50 from the DC supply voltage provided by the battery 22.

Using the field bus connection 32, the battery 22 and the bidirectional inverter 20 now start a handshake protocol to set up a communication between the two.

Moreover, the bidirectional inverter 20 uses the supply interface 38 to supply the separate backup device 24 with a supply voltage and makes an enabling signal available on the interface 35 for the control line 37 of the separate backup device. To this end, the control device 50 is configured as appropriate. The energy for this is obtained by the bidirectional inverter 20 from the applied DC supply voltage from the battery 22 via the supply interface 28.

The enabling signal on the control line 37 and/or the supply voltage for the separate backup device 24 are suitable for putting the separate backup device into an operating state.

Figure 8:
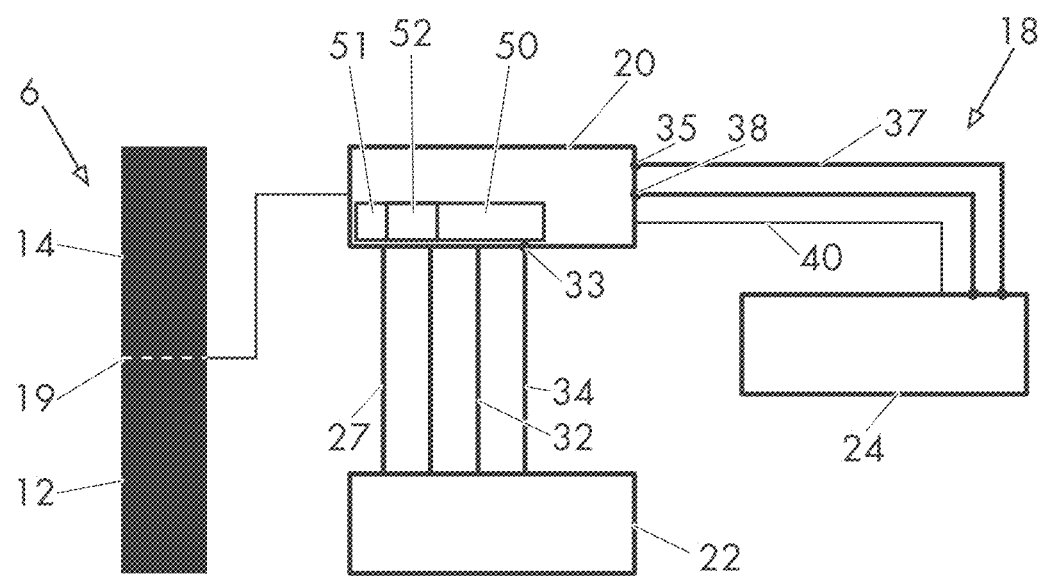

FIG. 8 schematically shows the power supply device 18 at a sixth point in time after completion of black starting according to the exemplary embodiment of the method according to the disclosure.

The separate backup device 24, which has been put into an operating state by the enabling signal and/or the supply voltage, and the bidirectional inverter 20 have set up a communication between the two devices after successful completion of a handshake protocol via the field bus connection 40. The battery 22 and the bidirectional inverter 20 have also set up a communication via the field bus connection 32. Additionally, the bidirectional inverter 20 makes a supply voltage of the battery 22 available for a battery management system (not depicted) on the interface 33 via the connection 34. In this state, the power supply device can begin normal operation.

Figure 9:
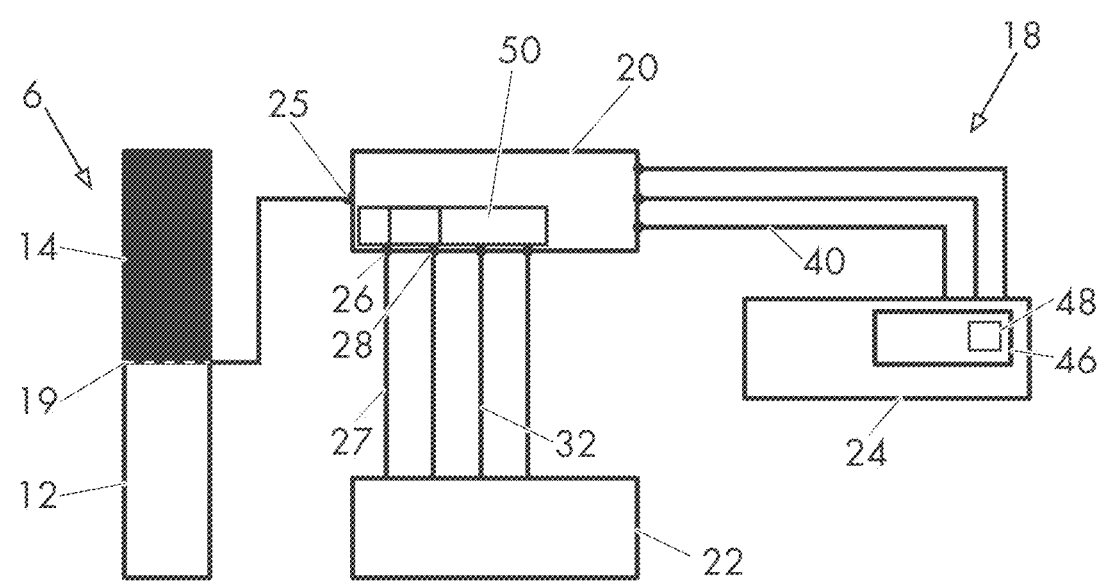

FIG. 9 shows the power supply device 18 of FIG. 2 at a seventh point in time during subsequent normal operation according to an exemplary embodiment.

The backup device 24 comprises a control module 46 having a microcontroller 48 and is connected (not depicted) to sensors (not depicted) and the isolating device 19. The backup device 24 is designed so as, in interaction with the bidirectional inverter 20, to allow emergency operation of the local grid 12 in the event of failure of the public grid 14. According to the exemplary embodiment depicted, the backup device 24 has to this end detected failure of the public grid 14 and disconnected the local grid 12 from the public grid 14 by actuating the isolating device 19 and, in interaction with the bidirectional inverter 20, set up an island mode of the local grid 12. In this instance, the bidirectional inverter 20 draws electrical energy from the battery 22, which electrical energy it then makes available to the connected loads (not depicted) of the local grid 12.

The invention claimed is:

1. A method for black starting a power supply device, wherein the power supply device comprises a bidirectional inverter having an AC-side connection for a grid and a battery connected to the DC side of the bidirectional inverter, the method comprising:
   operating an activation device of the power supply device so that the activation device applies a voltage to a control line of the battery to place the battery into an operating state, wherein the voltage provided by the activation device is provided by an auxiliary battery, and
putting the bidirectional inverter into an operating state after the voltage provided by the auxiliary battery is applied to the control line.

2. The method as claimed in claim 1, further comprising:
   using the battery that has been put into an operating state by the activation device to make a DC supply voltage available to the bidirectional inverter, wherein the DC supply voltage puts the bidirectional inverter into an operating state.

3. The method as claimed in claim 1, wherein the power supply device has a separate backup device or a backup device that the bidirectional inverter comprises, and wherein in a first case the separate backup device is also supplied with a supply voltage and put into an operating state by the bidirectional inverter.

4. The method as claimed in claim 1, wherein the bidirectional inverter, in the operating state, takes over the provision of the voltage, initially provided by the activation device, on a control line of the battery, and the activation device is put into an initial state for the battery.

5. The method as claimed in claim 1, further comprising initiating a handshake protocol between the battery and the bidirectional inverter for the purpose of setting up a communication between the two.

6. The method as claimed in claim 5, wherein an absence of a successful communication setup between the bidirectional inverter and the battery results in the provision of a DC supply voltage for the bidirectional inverter by the battery being stopped.

7. The method as claimed in claim 1, wherein the power supply device comprises further batteries connected to the bidirectional inverter, wherein the further batteries are each provided with a voltage on a control line, which voltages put the further batteries into an operating state, respectively, wherein the voltage is provided by the activation device and/or the bidirectional inverter, and wherein the further batteries, in the operating state, each make a DC supply voltage available to the bidirectional inverter and a handshake protocol is started between the further battery and the bidirectional inverter in each case for the purpose of setting up a communication between the two.

8. The method as claimed in claim 1, wherein the power supply device comprises further bidirectional inverters, each having at least one battery connected to the further bidirectional inverter, respectively, and in each case at least one connected battery of the further bidirectional inverters is provided with a voltage on a control line that puts the connected battery into an operating state, wherein the voltage is provided by the activation device or the bidirectional inverter or a separate backup device put into an operating state by the bidirectional inverter.

9. A bidirectional inverter, comprising:
a control device and interfaces for connecting a battery on a DC side thereof and for connecting a grid on an AC side thereof, wherein at least one supply interface is arranged for connecting two battery poles of the battery to the bidirectional inverter,
an interface for a control line of the battery, and
an activation device having an auxiliary battery,
wherein the activation device is configured so as, when the activation device is operated in the event of a black start, to provide on the interface for the control line a voltage, provided by the auxiliary battery, that is suitable for starting up the battery.

10. The bidirectional inverter as claimed in claim 9, wherein the bidirectional inverter is configured to be put into an operating state by the battery in the event of a black start by applying to the supply interface a DC supply voltage, provided by the battery, that is suitable for putting the bidirectional inverter into an operating state.

11. The bidirectional inverter as claimed in claim 9, wherein the control device is configured so as, in the event of a black start, to take over the provision of a voltage to maintain an operating state of the battery after the bidirectional inverter is started up.

12. The bidirectional inverter as claimed in claim 11, wherein the control device is configured to put the activation device into an initial state for the battery after said provision is taken over.

13. The bidirectional inverter as claimed in claim 9,
wherein the bidirectional inverter comprises interfaces for connecting multiple batteries,
wherein the activation device is configured such that the activation device, in the event of a black start, provides on the interfaces for the control lines voltages, provided by the auxiliary battery, that are suitable for starting up the batteries, and
wherein the control device is configured so as, in the event of a black start, to take over the provision of the voltages to maintain the operating state of the batteries after the bidirectional inverter is started up and to put the activation device into an initial state for the batteries.

14. The bidirectional inverter as claimed in claim 9, wherein the DC side of the bidirectional inverter additionally has an input configured to connect to a solar installation.

15. The bidirectional inverter as claimed in claim 9, wherein the bidirectional inverter comprises an internal backup device or a connection for a separate backup device, wherein the connection comprises at least one supply interface, wherein, in a second case, the control device is configured so as, in the event of a black start, to provide a supply voltage on the supply interface after the bidirectional inverter is started up and to put the separate backup device into an operating state.

16. The bidirectional inverter as claimed in claim 9, wherein the bidirectional inverter comprises at least one field bus interface for communication with the battery.

17. A backup device having a control device and an activation device having an auxiliary battery, comprising:
at least one interface for a supply voltage of the backup device and
at least one interface for a control line of a battery,
wherein the activation device is configured so as, when the activation device is operated in the event of a black start, to provide on the at least one interface for the control line of the battery a voltage, provided by the auxiliary battery, that is suitable for starting up the battery.

18. The backup device as claimed in claim 17, wherein the backup device is configured so that, from a shut-down state or standby mode, when:
the interface for the supply voltage has a supply voltage applied to it, or the interface for the supply voltage has a supply voltage applied to it and
additionally an interface for a control line of the backup device has an enabling signal applied to it,
the backup device changes to an operating state.

19. The backup device as claimed in claim 17, wherein:
at least one further interface for a supply voltage of the backup device, or
at least one further interface for a supply voltage of the backup device and
at least one further interface for a control line of the backup device is comprised.

20. A power supply device, comprising:
at least one bidirectional inverter having an AC-side interface for connecting a grid,
at least one battery connected to the DC side of the bidirectional inverter, and
at least one activation device having an auxiliary battery,
wherein the bidirectional inverter comprises interfaces for connecting the battery on the DC side,
wherein at least one supply interface is arranged for connecting two battery poles of the battery to the bidirectional inverter, and
the activation device is configured, when the activation device is operated in the event of a black start, to provide on an interface for a control line of at least one battery a voltage, provided by the auxiliary battery, that is suitable for setting up the battery.

21. The power supply device as claimed in claim 20, further comprising a separate backup device.

* * * * *